United States Patent [19]

Gordon

[11] 4,058,024
[45] Nov. 15, 1977

[54] MULTIPLE RING INERTIAL ENERGY STORAGE WHEEL WITH IMPROVED INTER-RING CONNECTOR

[75] Inventor: Hayden S. Gordon, Orinda, Calif.

[73] Assignee: Electric Power Research Institute, Inc., Palo Alto, Calif.

[21] Appl. No.: 694,257

[22] Filed: June 9, 1976

[51] Int. Cl.[2] .............................................. G05G 1/00
[52] U.S. Cl. ....................................... 74/572; 310/74; 403/202
[58] Field of Search ......................... 74/572, 573, 574; 310/67, 74; 403/202

[56] References Cited

U.S. PATENT DOCUMENTS

| 1,874,515 | 8/1932 | Harris ...................................... 74/574 |
| 3,368,654 | 2/1968 | Wegh et al. .............................. 74/573 |
| 3,683,216 | 8/1972 | Post ........................................ 74/572 |
| 3,859,868 | 1/1975 | Post ........................................ 74/572 |
| 4,027,549 | 6/1977 | Colletti ................................. 74/573 R |

*Primary Examiner*—Samuel Feinberg
*Attorney, Agent, or Firm*—Townsend and Townsend

[57] ABSTRACT

An inertial energy storage rotor defined by a plurality of independent, concentric rotor rings rotatable about a vertical axis. A spacer ring connects each outer rotor ring to its adjacent inner rotor ring and is constructed of a substantially rigid material. The spacer ring has a cylindrical configuration and a plurality of slots which alternatingly extend from opposing axial ends of the ring towards the opposite end of the ring. The slots terminate short of such opposite end. The spacer ring includes first and second connecting tabs which are disposed at the respective axial ends of the ring for engaging and rotationally interlocking the rings, supporting the outer ring on the inner ring, maintaining the rings concentric with respect to each other, and permitting differential dilations in the rings during high rates of rotation of the wheel.

17 Claims, 5 Drawing Figures

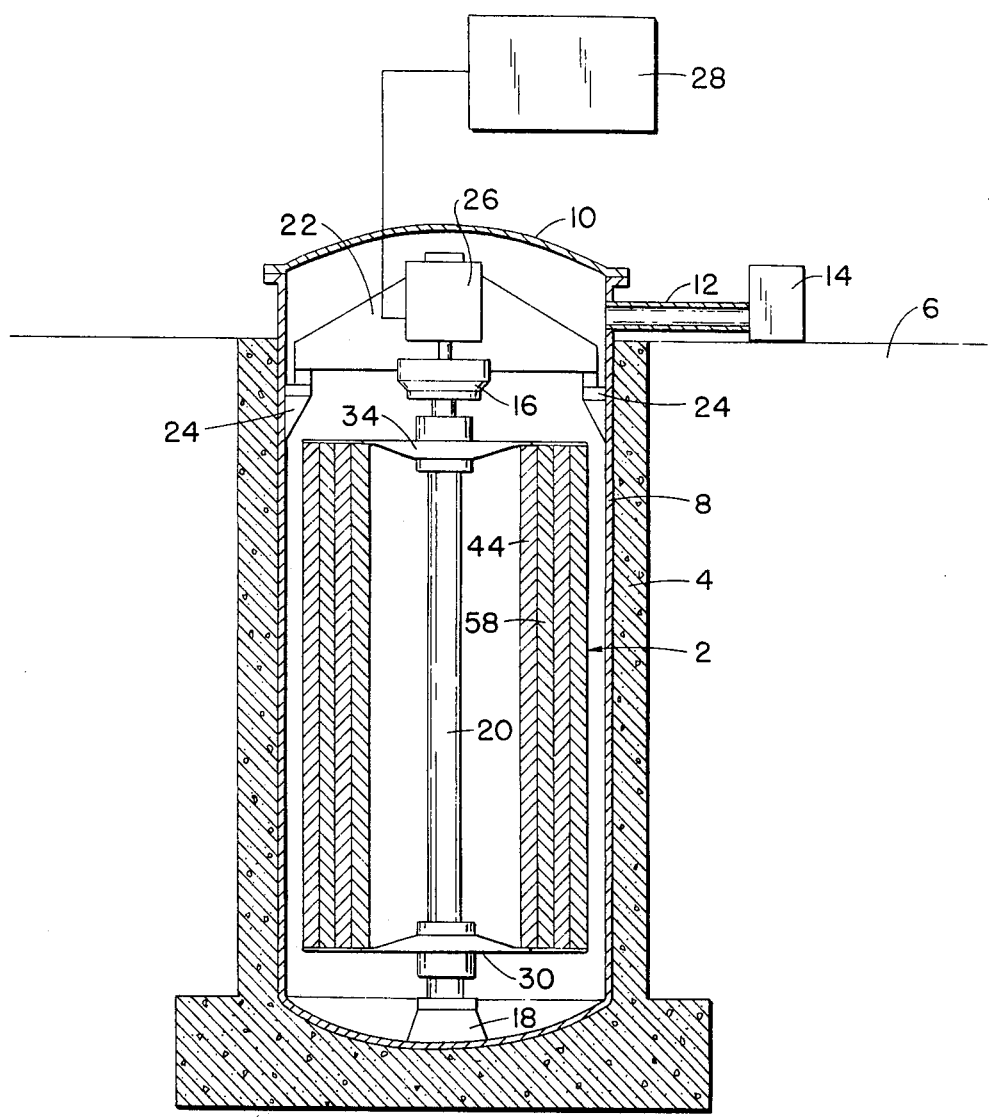
FIG.\_1.
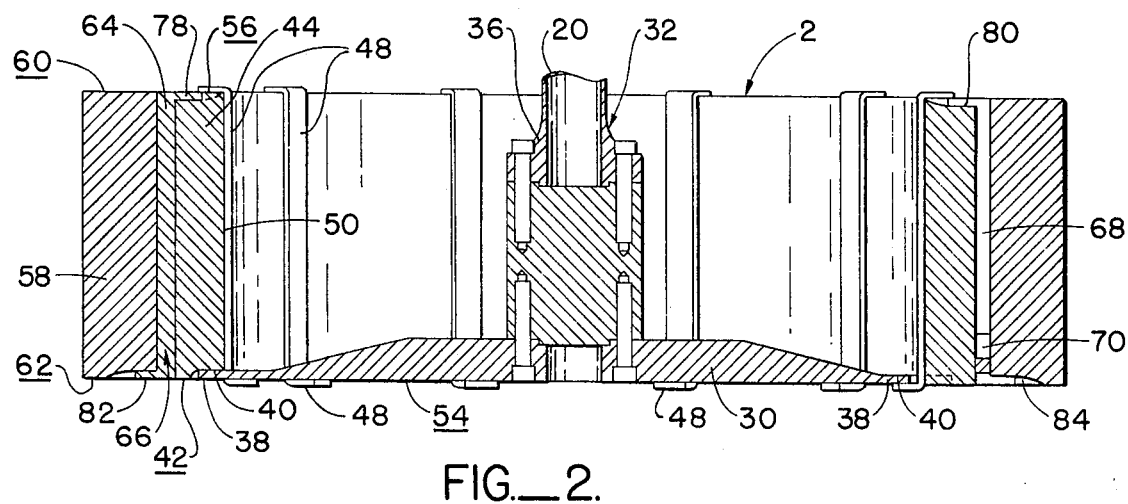
FIG.\_2.

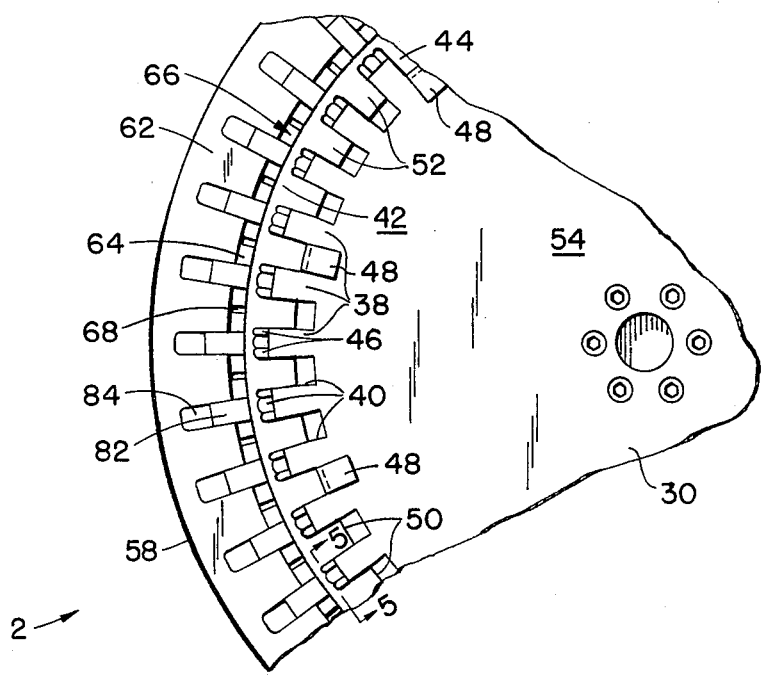
FIG._3.
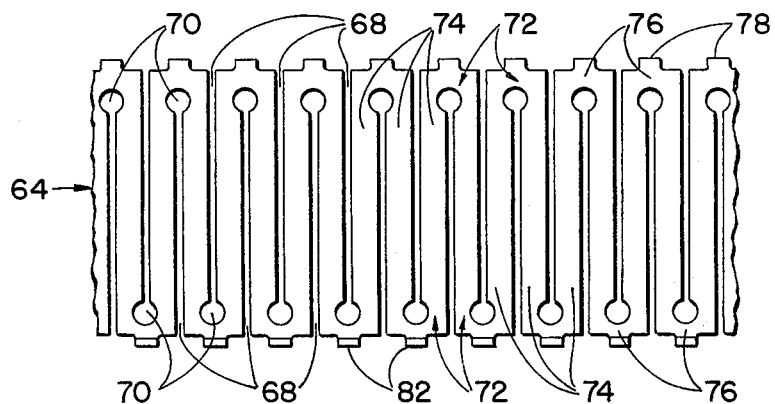
FIG._4.
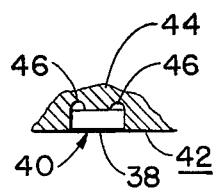
FIG._5.

MULTIPLE RING INERTIAL ENERGY STORAGE WHEEL WITH IMPROVED INTER-RING CONNECTOR

BACKGROUND OF THE INVENTION

Today's energy shortages make it increasingly necessary to store energy which becomes available during periods of relatively low energy demand for use during peak demand periods. For example, solar energy is readily available during relatively low day time demand periods but is frequently unavailable during the peak evening hour demand periods.

It has been suggested to store excess energy with inertial energy storage wheels or rotors. Such energy storage requires that excess energy, normally electrical power, is used to drive an electrical motor-generator to spin the rotor at often very high rates of rotation. To recover the energy, the motor-generator is operated in its generator mode to generate electricity while correspondingly decreasing the rotor's rate of rotation, thereby converting the rotors inertial energy into electrical power. To store a meaningful amount of energy, the rotors have to be spun at rates as high as 20,000 rpm and more, depending on the diameter of the rotor. This severely stresses the rotor and requires that it be specially constructed so that it can withstand the centrifugal forces generated by such high rates of rotation.

It is known that the stress to which a rotating ring is subjected comprises both hoop or circumferential stresses, which subject the ring material to tension, and radial stresses which subject the material to translaminar tension. In the radial direction the tensile stresses are carried by the matrix material only which is relatively weak. Since the radial tensile stress depends upon the ring thickness-to-radius ratio the ring must be relatively thin to maintain the stresses within the limits of the matrix material.

To achieve the required high energy storage densities materials with a high strength-to-weight ratio necessary. The materials with the highest strength-to-weight ratios currently are fiber materials such as those used for the reinforcement of plastic composites. The fiber composites, therefore, offer the potential of very high energy storage densities. Problems exist, however, due to the orthotropic properties of the composites. They possess very high strength in the direction of the fibers, that is, in a circumferential direction, and very little strength in the transverse directions, that is, in a radial direction. Thus, fiber composite materials can withstand only very limited radial forces.

A theoretical ring with no radial thickness would not be subjected to any radial stress but to hoop stresses only. Thus, to limit the radial stresses in such rings to acceptable values, their radial thickness must be relatively small. Accordingly, it has been suggested to construct inertial energy storage rotors by combining a plurality of relatively thin, concentric rings into one storage rotor. The rings are mounted to a concentric hub, which in turn rotates about a vertical axis. The rings are interconnected by resilient, e.g. elastomeric spacers disposed between each adjacent inner and outer ring. U.S. Pat. Nos. 3,683,216 and 3,741,034 generally describe the construction of inertial energy storage wheels constructed of a plurality of concentric rotor rings carried by a common hub. Elastomeric spacer rings connect each inner ring to its adjacent outer ring.

The spacer rings are constructed of an elastomeric material so that the rings can move relative to each other in a radial direction; that is, during rotation of the hub each outer ring expands or dilates a greater amount than its adjacent inner ring because the rate of expansion of each ring due to centrifugal forces is directly related to its mean diameter. Consequently, as the rate of rotation of the wheel increases the gaps between adjacent rings also increase. The spacer rings must accommodate this differential expansion of the rotor rings. Additionally, the spacer rings function to center the rings with respect to each other.

Under the high centrifugal forces, and the resulting large radial dilations to which rotors of the type disclosed in the above-referenced U.S. patents are subjected the use of elastomeric spacer rings between each pair of rotor rings has drawbacks. The differential radial expansion of the rings is relatively large. This severely stresses the elastomeric spacer ring. More seriously, it places a severe stress on the connection, e.g. the bond between the spacer ring and the rotor rings. In many instances, the bond, or the ring material underlying the bonded areas, fails which can lead to a potentially disastrous failure of the whole ring assembly.

Additionally, the relatively large differential expansion between the rotor rings requires the use of relatively soft elastomeric materials. Material softness, or excessive flexibility of the spacer rings, however, can give rise to a dynamic instability at high rates of rotation which induces vibrations. The latter in turn can damage the rotor, the rotor shaft, or the bearings in which the shaft is journaled. Increasing the hardness or stiffness of the spacer rings, on the other hand, limits the amount of relative dilation between the inner and the outer rotor ring which can be accommodated by the spacer ring. Consequently, prior art rotor rings must be either relatively thin, which renders the rotor wheel assembly more expensive, or that the rotor must be operated at a lower speed, because the spacer ring would otherwise fail due to its inability to accommodate the large relative ring dilations.

Thus, it is apparent that prior art multiple ring inertial energy storage rotor wheels have serious drawbacks which limit their potential use and which correspondingly limit the development of the otherwise highly desirable inertial energy storage wheels.

SUMMARY OF THE INVENTION

In accordance with the present invention the prior art elastomeric spacer ring between a pair of adjacent inner and outer rotor rings of an inertial energy storage wheel is replaced with a spacer ring constructed of a rigid material such as metal. The ring is further loosely, that is readily demountably attached to the rotor rings to eliminate the need for permanent connections which are subjected to high stresses and which are potential points of failure during high speed operation of the energy storage wheel. The earlier discussed shortcomings of enertial energy storage wheels such as are disclosed in the referenced U.S. patents are thereby overcome.

Generally speaking, an inertial energy storage wheel constructed in accordance with the present invention comprises a plurality of concentric, inertial energy storage rotor rings. A hub supports the innermost rotor so that its axis is vertically oriented. Means is provided for rotating the wheel about a vertical axis concentric with the axes of the rotor rings. A rotor spacer ring is disposed between each set of adjacent rotor rings for supporting the outer rotor of each set from the inner rotor of such set and for maintaining the rotors concentric while permitting their radial dilation when subjected to high rates of rotation about their common axis.

The spacer ring is constructed of a metallic material and comprises a multiplicity of opposing, side by side and interconnected U-shaped members arranged to define a cylindrical spacer ring. Each U-shaped member is in turn defined by a pair of parallel legs and a portion interconnecting adjacent ends of the legs so as to define a slot between each pair of legs. The slots alternatingly terminate at opposite axial ends of the spacer ring.

A plurality of first and second tab means is secured to the interconnecting portions of the U-shaped members at upper and lower end faces of the spacer ring, respectively. The first tab means extend radially inward from the upper end face and the second tab means extend radially outward from the lower end face of the spacer ring. The inner rotor ring has a plurality of first, radially oriented grooves in an upper end face thereof for snugly nesting the first tab means. Similarly, the outer rotor ring has a plurality of radially extending second grooves in its lower end for snugly receiving the second tab means. In this manner, the first tab means concentrically positions the spacer ring with respect to the inner rotor and the second tab means concentrically positions the outer rotor with respect to the spacer ring. Furthermore, the spacer ring supports the outer ring on the inner ring and transmits rotational forces (during accelerations or decelerations of the wheel) from one ring to the other. The U-shaped members define a continuous, cylindrical, radially resilient spring support which accommodates the differential radial expansion between the outer and inner rotor rings resulting from the relatively larger dilation of the outer rotor ring when subjected to high rates of rotation.

In the preferred embodiment of the invention the spacer ring is further constructed so that its outer diameter is slightly larger than the inner diameter of the corresponding outer rotor ring when the spacer ring is relaxed. To install the rings the spacer ring is slightly compressed, which is readily done due to its slotted construction, moved into axial alignment with the outer ring and then released. This assures that the spacer ring is at all times in contact with the outer rotor ring. To facilitate the ready assembly of the rotor rings and the spacer ring the thickness of the spacer ring is slightly less than the thickness of the gap between the rotor rings when the latter are stationary. In this manner, the rings can be axially moved into each other.

The spacer ring of the present invention affords several advantages as compared to the elastomeric spacer rings that were proposed in the past because it is no longer necessary to bond or otherwise physically secure the spacer ring to each adjacent rotor ring. Instead, the spacer ring of the present invention merely supports the weight of the outer ring on the inner ring while the tabs, which are received in snugly fitting grooves in the corresponding end faces of the rotor rings, assure concentricity between the rotor rings and the spacer rings. Even during high speed operation, this concentricity is virtually fully maintained because the maximum eccentricity that can develop between the rotor rings and the spacer rings is the amount by which the tab receiving grooves in the end faces of the rotor rings increase in width because of the dilation of the rotor ring during operational speeds. This increase in the groove width, however, is normally negligible and does not appreciably affect the operation of the wheel.

It will thus be apparent that the present invention not only simplifies the construction, and particularly the assembly of the inertial energy storage wheel as compared to prior art wheels, but it further significantly increases its operational characteristics and particularly, its ability to withstand very high operating speeds without danger of failing. Consequently, the present invention significantly improves the operating characteristics of inertial energy storage wheels. This should contribute to an early and widespread commercial use thereof which in turn should result in energy which is more readily available at the times at which it is required and at a more reasonable cost as to prior art energy storage methods.

BRIEF DESCRIPTION OF THE DRAWINGS

FIG. 1 is a schematic, elevational view, in section, illustrating an inertial energy storage wheel installation incorporating a multiple ring rotor constructed in accordance with the present invention;

FIG. 2 is an enlarged, fragmentary, elevational view, in section, of a portion of the rotor wheel shown in FIG. 1 and in particular illustrates the connection between the wheel hub, an inner and an outer rotor ring and an intermediate spacer ring;

FIG. 3 is a fragmentary bottom end view of the rotor wheel shown in FIG. 2;

FIG. 4 is a fragmentary, developed elevational view of a spacer ring constructed in accordance with the present invention; and FIG. 5 is a fragmentary view, in section, and is taken on line 5—5 of FIG. 3.

DESCRIPTION OF THE PREFERRED EMBODIMENTS

Referring first to FIG. 1, an installation employing an inertial energy storage wheel or rotor 2 constructed in accordance with the present invention is schematically illustrated. The rotor is housed in a concrete wall 4 lowered into the ground 6 and lined with an impact resistant material such as steel defining an airtight, upwardly open tank 8 closed by a cover 10. A fluid conduit 12 connects the interior of the tank with a vacuum pump 14 for evacuating the interior of the tank to as low a pressure as one-tenth millitorr.

Mounted within tank 8 are upper and lower bearings 16 and 18 which journal a rotor shaft 20 for rotation about a vertical axis. The upper bearing is supported by a spider 22 carried on pedestals 24 which protrude from the inner wall of tank 8. The spider also supports a generator-motor 26 which is suitably coupled to rotor shaft 20 and which is controlled by electric controls 28 so that it can alternatively be operated in its generator or its motor mode for alternatively converting inertial energy of the rotating wheel 2 into electricity or for converting electricity into inertial energy by correspondingly increasing the rate of rotation of the wheel (hereinafter sometimes referred to as "rotation"). The detailed construction of the electric controls 28 is well-known to those skilled in the art and, therefore, is not further described herein.

Referring now to FIGS. 1–5, the construction of rotor 4 is described in greater detail. At the outset it should be noted that the rotor shown in FIGS. 2–4 is illustrated as supported by a single hub 30 depending from a lower end 32 of shaft 20. The rotor illustrated in FIG. 1 is shown to comprise a lower hub 30 as well an upper hub 34 mounted to shaft 20, which in turn is supported by the earlier mentioned upper and lower bearings 16, 18. The main difference between the rotor constructions illustrated in FIGS. 1 and FIGS. 2-4 is that the rotor illustrated in the latter figures is supported on a cantilevered type shaft and has a height substantially less than the height of the rotor shown in FIG. 1. This difference, however, does not affect the invention which resides in the interconnection of the concentric rotor rings as is described below.

Referring now to FIGS. 2-5, lower hub 30 has an essentially disc-shaped configuration and is conventionally bolted to a flange 36 defining the lower end 32 of shaft 20. The wall thickness tapers outwardly as is conventional for discs which are subjected to high rates of rotation so as to reduce the maximum stress to which the hub is subjected and to further assure a substantially uniform stress in all portions of the hub. Such hubs are conventional and commonly referred to as Stodola discs.

The outer periphery of the hub includes a plurality of evenly spaced, radially oriented horizontal teeth 38 which are snugly received, that is which have a close tolerance fit with correspondingly dimensioned and oriented grooves 40 in a lower end face 42 of a first, inner rotor ring 44. The corners of the groove are relieved as by end milling depressed corner slots 46 to prevent the concentration of stresses during high speed operation of rotor 2 and the formation of cracks in the groove corners and a resulting danger of failure of the rotor. It will be noted that when inner rotor ring is lowered onto hub teeth 38 the engagement of the teeth by rotor ring grooves 40 centers the ring relative to the hub. If there is no play between the teeth and the grooves an exact concentricity of the hub and the ring is achieved without the need for physically connecting them, e.g. bolting, bonding or the like by merely placing the ring on top of the hub and axially sliding the teeth and the grooves into mutual engagement.

To prevent accidental axial movements between hub 30 and inner rotor ring 44 a plurality of Z-shaped, vertically oriented clips 48 are provided. The clips extend through a gap between the inner diameter 50 of rotor ring 44 and an open space 52 between hub teeth 38. The lower ends of the clips extend inwardly and engage an undersurface 54 of hub 30 while the upper ends of the clips extend radially outward and engage an upper end face 56 of rotor ring 44. In this manner, accidental axial movements between the hub and the inner rotor ring are prevented. It should be noted, however, that the Z-shaped clips 48 only prevent axial movements. They are incapable of transmitting radially acting forces or relative radial movements between the rotor ring and the hub. The clips can also be used as weight for balancing the assembled rotor. For example, additional clips can be installed, or holes can be drilled through them until the rotor is fully balanced.

Disposed concentrically to inner rotor ring 44 is an adjacent outer rotor ring 58. It includes upper and lower axial end faces 60 and 62, respectively, and it is attached to the inner rotor ring by a generally Z-shaped, cylindrical spacer ring 64 disposed in a gap 66 between the two adjacent rotor rings.

The spacer ring is alternatingly slotted from one end face towards the opposite end face to define a plurality of slots 68 which alternatingly terminate in one or the other of the end faces of the spacer ring. Each slot terminates at an enlarged bore or cutout 70 which extends radially through the spacer ring and is disposed adjacent the end face opposite the end face from which the slot extends. It is thus apparent that the spacer ring is defined by a plurality of alternatingly opposite U-shaped members 72 each defined by a pair of axially oriented, vertical legs 74 and a portion 76 which interconnects each pair of legs. It will also be noted that the interconnecting portions 76 are evenly circumferentially spaced and the portions at the respective end faces of the spacer ring are offset with respect to each other. FIG. 4 is a developed view of the spacer ring and shows the alternating arrangement of the slots and U-shaped members.

A plurality of radially oriented tabs 78 protrude from the interconnecting portions 76 of the spacer ring in a radially inward direction. The tabs are snugly received, as above defined, in corresponding grooves 80 formed in the upper end face 56 of inner rotor ring 44. Thus, the close tolerance fit between the tabs and the associated rotor ring grooves assures concentricity between the inner rotor ring and the spacer ring.

Similarly, a plurality of outer tabs 82 protrude from the interconnecting portions 76 at the lower axial end of the spacer ring in a radially outward direction. The outer tabs are snugly received in corresponding grooves 84 in the lower end face 62 of outer rotor ring 58. Again, by virtue of the snug, virtually tolerance-free fit between the outer tabs and the corresponding grooves in the outer rotor ring, the outer ring is concentric with respect to the spacer ring and, therefore, it is concentric relative to the inner rotor ring, the hub and the axis of rotation, namely, the axis of shaft 20.

From the preceding description of the spacer ring 64 it will be apparent that the earlier mentioned Z-shaped configuration of the ring is defined by the cylindrical center portion of the ring together with the inwardly and outwardly protruding tabs. The latter in turn are formed by the slots 68 which divide otherwise continuous upper and lower end flanges of the ring into individual, radially extending tabs. It is apparent from the drawings that the width of the slot between the tabs is greater than the width of the slot in the cylindrical center portion of the spacer ring since it is desirable to have tabs of a width which is approximately equal to the width of the spaces between the tabs. In this manner, sufficient material is provided in the corresponding end faces of the inner and the outer rings to avoid excessive stresses therein during operation of the wheel and particularly during accelerating or decelerating modes.

Additional, radially outward disposed rotor rings, such as are schematically illustrated in FIG. 1 can be provided to give the rotor wheel 2 the desired mass. Each additional outer rotor ring is supported by another spacer ring (not shown in the drawings) which is constructed as described above. In each such case, the rotor ring adjacent the inner diameter of such additional outer rotor ring supports the latter in the manner described above.

The assembly of a rotor 2 in accordance with the present invention should now be apparent. To briefly summarize it, hub 30 is vertically positioned and the inner rotor ring 44 is axially moved against the hub until hub teeth 38 are nested in the corresponding rotor ring grooves 40. Thereafter the desired number of Z-shaped clips 48, say eight or ten such clips are inserted through the open spaces 52 between the hub teeth 38 and the respective ends of the clips are engaged with the under-side 54 of the hub and top end face 56 of rotor ring 44. The inner rotor ring and the hub are now axially (but not radially) constrained to each other.

Spacer ring 64 is axially moved towards inner rotor ring 44 until the inwardly extending tabs 78 of the spacer ring nest in the corresponding rotor ring grooves 80. As above mentioned, engagement of the spacer ring in the grooves results in an automatic centering of the latter with respect to the inner rotor ring and, therewith, with respect to the hub.

Spacer ring 64 is now compressed and outer rotor ring 58 is axially moved into engagement with the spacer ring so that the grooves 84 in the lower end face 62 of the ring receive the outwardly extending spacer ring tabs 82. If desired, additional rotor rings can be assembled in the same manner. After the installation of the last rotor ring, the assembly of the rotor is complete. It will be noted that in the described embodiment, no upper hub (as shown in FIG. 1) is shown and the assembly is described in terms of a vertical axis of rotation. In this manner, imbalances due to gravity are eliminated. From a practical standpoint it may be desirable to substantially increase the length of the rotor rings and the spacer rings over their lengths shown in FIG. 2. And in such cases, the provision of an upper hub, which would be constructed identically to the construction of the lower hub, is preferred and enables the operation of the wheel in orientations other than a vertical orientation. The provision of such an upper hub limits the possibility of axial movements between the lower hub and the inner rotor ring and, therefore, eliminates the need for the Z-shaped clips 48.

To facilitate the assembly of rotor 2, the cylindrical portion of spacer ring 64 is slightly thinner than the width of gap 66 between the inner and the outer rotor rings 44, 48 to avoid an interference fit. Additionally, the spacer ring is constructed so that in its relaxed or unstressed condition, the outer diameter of the cylindrical portion is slightly greater than the inner diameter of the outer rotor ring 58. During the assembly of the rotor the spacer ring is slightly compressed, which is readily done due to the springiness of the spacer ring caused by its slotted construction, to enable the placement of the outer ring over the spacer ring. Upon release of the spacer ring it is, therefore, supported by the outer rotor ring at all times, that is at rest as well as during high speed operation.

Turning now to the operation of the inertial energy storage rotor 2 of the present invention, and assuming that the rotor is constructed as illustrated in FIGS. 2-5, electric controls (FIG. 1) are actuated to operate motor-generator 26 (FIG. 1) in its motor mode, thereby accelerating the rate of rotation of rotor 2 and converting electrical energy into inertial energy. As the rotation increases centrifugal forces are developed within each rotor ring which cause it to expand or dilate in proportion to its mean diameter. Assuming identical materials for both the inner and the outer rotor rings 44 and 58, the outer ring dilates a greater amount than the inner ring because the mean diameter of the former is larger than that of the latter. As a result the inner diameter of the outer rotor ring moves outwardly relative to the outer diameter of the inner rotor ring, causing an increase in the width of gap 66 between them. Spacer ring 64 accommodates such increase since the U-shaped members 72 form a continuous series of circularly arranged, interconnected spring elements which can readily expand by an amount equal to the dilation of the outer rotor ring 58 because the inwardly extending spacer ring tabs 78 can slide relative to the inner rotor ring 44 in radial grooves 40. Thus, spacer ring 64, though constructed of a rigid, inflexible material such as steel, can accommodate relative radial movements between adjacent rotor rings, and can itself dilate. The U-shaped members 72 forms spring elements which permit such dilation of the spacer ring without developing high stresses therein.

The frictional engagement between the spacer ring and the inner diameter of the outer rotor ring 58 increases with an increase in the rotation of the rotor because the centrifugal forces developed within the spacer ring press it against the out rotor ring. This helps to prevent the build-up of inter-ring vibrational modes (even though such modes may lie within the range of operating speeds of the rotor) because the centrifugal loading of the spacer ring against the outer rotor ring tends to frictionally lock the former against the latter. This frictional interlock inhibits the development of vibrations during high speed operations as are commonly encountered with spacer rings constructed in accordance with the prior art, e.g. elastomeric spacer rings. Consequently, the operational characteristics of a rotor constructed in accordance with the present invention are enhanced because the spacer ring significantly reduces high speed vibrations.

I claim:

1. In an apparatus for storing inertial energy having a rotor defined by a plurality of independent, concentrically arranged rotor rings; inter-ring spacer means connecting an inner rotor ring to an outer ring and permitting relative, concentric radial movements between the inner and the outer rings to accommodate radial expansions of the rings due to centrifugal forces; and means for rotating the rotor rings about a common, concentric axis; the improvement to the inter-ring spacer means comprising: a spacer ring constructed of a substantially rigid material disposed between an inner ring and an outer ring, the spacer ring having a cylindrical configuration, a plurality of slots alternatingly extending from opposing axial ends of the ring towards the opposite end of the ring and terminating short of such opposite end, and first and second connecting means disposed at the respective axial ends of the ring for engaging the adjacent outer and inner rings, the first and second connecting means being circumferentially offset with respect to each other.

2. Apparatus according to claim 1 wherein the first and second connecting means comprise radially oriented tabs protruding from the respective axial ends of the spacer ring in opposite directions.

3. Apparatus according to claim 2 wherein the slots terminate in a slot end proximate to such opposite ring end, and wherein the tabs extend from portions of the ring in substantial axial alignment with the slots.

4. Apparatus according to claim 1 wherein the means for rotating includes means for rotating the rotor rings about a substantially vertical axis so that the spacer ring is substantially vertically oriented, and wherein the first connecting means comprises a plurality of circumferentially spaced apart tabs protruding in a radially outward direction from a lower end of the spacer ring; whereby the tabs support the outer rotor ring.

5. Apparatus according to claim 4 wherein the second connecting means comprises a plurality of circumferentially spaced apart second tabs protruding radially inwardly from an upper end of the spacer ring; whereby the second tabs engage the inner rotor ring and support the spacer ring and thereby the outer rotor ring from the inner rotor ring.

6. Apparatus according to claim 5 wherein the first and second tabs are alternatingly offset with respect to each other.

7. Apparatus according to claim 1 wherein the slots are arranged so as to define a series of interconnected, opposing U-shaped elements, and wherein each of the tabs protrudes from a portion of the U-shaped elements interconnecting adjacent legs of that U-shaped element.

8. An inertial energy storage wheel comprising a plurality of concentric, inertial energy storage rotors, means for supporting an innermost rotor so that its axis is vertically oriented, means for rotating the wheel about a vertical axis concentric with the axes of the rotors, and a spacer ring disposed between each set of adjacent rotors for supporting the outer rotor of each set from the inner rotor of such set and for maintaining the rotors concentric while permitting their radial dilation when subjected to high rates of rotation, the spacer ring being constructed of a metallic material and comprising a multiplicity of opposing, side-by-side and interconnected U-shaped members arranged to define a cylindrical spacer ring, each U-shaped member being defined by a pair of parallel legs and a portion interconnecting one end of the legs so as to define a slot between each pair of legs, adjacent slots alternatingly terminating at opposite axial ends of the spacer ring, a plurality of first and second tab means secured to the interconnecting portions of the U-shaped members at upper and lower end faces of the ring, respectively, the first tab means extending radially inward from the upper end face and the second tab means extending radially outward from the lower end face of the spacer ring, first groove means at an upper end of the inner rotor for snugly nesting the first tab means, and second groove means at a lower end of the outer rotor for snugly receiving the second tab means, whereby the first tab means concentrically positions the spacer ring with respect to the inner rotor and the second tab means concentrically positions the outer rotor with respect to the spacer ring, and whereby the spacer ring further supports the outer ring on the inner ring and the U-shaped members define a continuous, cylindrical, radially resilient spring support accommodating a differential radial expansion between the outer and the inner rotors when subjected to high rates of rotation.

9. A wheel according to claim 8 wherein an outer diameter of the spacer ring is dimensioned to snugly engage an inner diameter of the outer rotor.

10. A wheel according to claim 9 wherein the outer diameter of the relaxed spacer ring slightly exceeds the inner diameter of the unstressed outer rotor.

11. A wheel according to claim 8 wherein the spacer ring has a thickness only slightly less than the width of a gap between the inner and the outer rotors so as to prevent an interference between the rotors and the spacer ring and to thereby enable their assembly by axially moving the rotors and the spacer ring into mutual engagement.

12. An inertial energy storage wheel comprising:
a central, generally disc-shaped hub for rotation about a vertical axis, the hub including a plurality of spaced apart, radially extending peripheral tabs disposed in a common plane;
a first, cylindrical inertial energy storage rotor including upper and lower end faces each including a plurality of radially oriented grooves, the grooves in the lower end face corresponding in number, orientation and dimensioning to the radial tabs of the hub for snugly receiving the tabs to thereby support the first rotor on the hub and position it concentric with respect thereto;
a spacer ring having a generally Z-shaped cross-section defining upper and lower end flanges extending radially inward and outward, respectively, from an intermediate, cylindrical portion having an inner and an outer diameter, the spacer ring including a plurality of first and second slots extending from an upper end face of the spacer ring towards the lower end face thereof, and from the lower end face towards the upper end face, respectively, but terminating short thereof so as to segment the radial flanges into a plurality of inwardly and outwardly extending radial tabs, the inwardly extending tabs being snugly received within the radial grooves in the upper end face of the inner rotor to thereby concentrically position the spacer ring with respect to the inner rotor and support it thereon; and
at least one outer rotor including upper and lower axial end faces, the lower end face of the outer rotor including a plurality of radially oriented grooves dimensioned to snugly receive the outwardly extending tabs of the spacer ring to thereby support the outer rotor on the spacer ring and concentrically position it with respect to the spacer ring, the inner rotor and the hub, the outer rotor having an inner diameter slightly smaller than the outer diameter of the spacer ring in its relaxed state;
whereby upon the rotation of the wheel the outer rotor expands by a greater amount than the inner rotor and the spacer ring is permitted to expand by the same amount as the outer rotor so as to maintain firm contact therewith at all times while the inwardly extending tabs continue to be supported and concentrically positioned by the inner rotor.

13. A wheel according to claim 12 wherein the portion of the slots disposed within the cylindrical portion of the spacer ring have a constant width.

14. A wheel according to claim 13 including an enlarged cutout extending radially through the spacer ring adjacent a blind end of each slot and in communication with such slot.

15. A wheel according to claim 12 wherein the slots define a series of interconnected, alternatingly oppositely oriented U-shaped members, each member being defined by a pair of parallel, axially extending legs and a portion interconnecting adjacent ends of the legs, and wherein the tabs protrude in a radial direction from such interconnecting portion.

16. A wheel according to claim 15 wherein the width of the tabs is less than the width of the corresponding U-shaped member.

17. An inertial energy storage wheel comprising a plurality of concentric, inertial energy storage rotors, means for rotating an innermost rotor about an axis of rotation, and a spacer ring disposed between each set of adjacent rotor rings for supporting and rotationally interconnecting such adjacent rotor rings and for maintaining the rotor rings concentric while permitting their radial dilation when subjected to high rates of rotation, the spacer ring having a generally cylindrical configuration and a plurality of axially oriented slots alternatingly extending from axial end faces of the spacer ring towards an opposite end face to thereby define a plurality of interconnected, circumferentially arranged, generally U-shaped members, the spacer ring being dimensioned so as to engage an inner diameter of the adjacent outer rotor ring at all operating speeds while permitting the outer rotor ring to radially dilate an amount greater than the radial dilation of the inner rotor ring during rotation of the wheel, whereby centrifugal forces developed within the spacer ring are transmitted to the adjacent outer rotor ring to form a frictional interlock between the spacer ring and the outer rotor ring and to thereby counteract the generation of inter-ring vibrations during the rotation of the wheel.

* * * * *